(12) United States Patent
Kaita et al.

(10) Patent No.: US 8,583,309 B2
(45) Date of Patent: Nov. 12, 2013

(54) HYBRID VEHICLE AND CONTROL METHOD OF HYBRID VEHICLE

(75) Inventors: Keiji Kaita, Miyoshi (JP); Takahiko Hirasawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1 day.

(21) Appl. No.: 13/509,199

(22) PCT Filed: Nov. 13, 2009

(86) PCT No.: PCT/JP2009/069396
§ 371 (c)(1),
(2), (4) Date: May 10, 2012

(87) PCT Pub. No.: WO2011/058654
PCT Pub. Date: May 19, 2011

(65) Prior Publication Data
US 2012/0226406 A1    Sep. 6, 2012

(51) Int. Cl.
*B60L 9/00* (2006.01)

(52) U.S. Cl.
USPC ............ 701/22; 701/51; 701/52; 701/53; 701/54; 701/55; 701/56; 180/65.265

(58) Field of Classification Search
USPC ............ 701/22, 51–56; 290/240; 180/65.265; 903/941
See application file for complete search history.

(56) References Cited

FOREIGN PATENT DOCUMENTS

| JP | 11-348607 A | 12/1999 |
|---|---|---|
| JP | 2003-176867 A | 6/2003 |
| JP | 2005-325843 A | 11/2005 |
| JP | 2007-284005 A | 11/2007 |
| JP | 2008-174148 A | 7/2008 |
| JP | 2009-184500 A | 8/2009 |
| JP | 2009-248940 A | 10/2009 |

*Primary Examiner* — James Trammell
*Assistant Examiner* — Majdi Alsomiri
(74) *Attorney, Agent, or Firm* — Sughrue Mion, PLLC

(57) ABSTRACT

When the gearshift position SP is the N position and the accumulated charge ratio SOC of the battery is less than or equal to the threshold value Slow (step S120), the engine is cranked by a first motor (the motor MG1) and started in the case that the vehicle stop is held (steps S140 and s150). After the engine is started, the shutoff of the inverter for driving the motor MG1 is performed and the self-sustained operation of the engine is performed at the rotation speed N1 at which the back electromotive force generated on the motor MG1 is more than the voltage applied to the inverters (steps S180 to S200).

5 Claims, 6 Drawing Sheets

Fig. 1

HYBRID VEHICLE AND CONTROL METHOD OF HYBRID VEHICLE

CROSS REFERENCE TO RELATED APPLICATIONS

This application is a National Stage of International Application No. PCT/JP2009/069396, filed on Nov. 13, 2009, the contents of all of which are incorporated herein by reference in their entirety.

TECHNICAL FIELD

The present invention relates to a hybrid vehicle and a control method of a hybrid vehicle.

BACKGROUND ART

One proposed hybrid vehicle has an engine, a generator (a motor MG1) that rotates at a rotation speed corresponding to a rotation speed of the engine and generates electric power, a first inverter that drives the motor MG1, a motor (a motor MG2) that linked to an axle, a second inverter that drives the motor MG2, and a battery that transmits electric power to and from the motors MG1 and MG2 via the first inverter and the second inverter. This hybrid vehicle shuts off the first inverter and the second inverter after start of the engine, in a case that a gearshift position is set to a neutral position in a state that operation of the engine is stopped (see, for example, Patent Document 1). In this hybrid vehicle, after shutoff of both of the first inverter and the second inverters, self-sustained operation of the engine is performed at a rotation speed which is relatively low in a case that a state of charge of the battery is more than or equal to a threshold value, and the self-sustained operation of the engine is performed at a rotation speed at which back electromotive force generated on the motor MG1 is more than a voltage applied to the first inverter and the second inverter in a case that the state of charge of the battery is less than the threshold value. This enables to charge the battery with continuation of shutoff of both of the first inverter and the second inverter.

PRIOR ART DOCUMENT

Patent Document

Patent Document 1: Japanese Patent Laid-Open No. 2009-184500

SUMMARY OF THE INVENTION

However, in the above described hybrid vehicle, the engine is immediately started after the gearshift position is set to the neutral position. Thus fuel is consumed by performance of the self-sustained operation of the engine, even when it is not necessary to charge the battery such as when the state of charge of the battery is relatively high.

In a hybrid vehicle and a control method of a hybrid vehicle of the invention, the main object of the invention is to charge a secondary battery according to the requirements with prevention of fuel consumption when a gearshift position is a neutral position.

In order to attain the main object, the hybrid vehicle and the control method of the hybrid vehicle of the invention have the configurations discussed below.

According to one aspect, the present invention is directed to a hybrid vehicle. The hybrid vehicle has: an internal combustion engine; a generator that inputs and outputs power from and to an output shaft of the internal combustion engine, rotates at an rotation speed corresponding to an rotation speed of the internal combustion engine, and generates back electromotive force with rotation; a generator inverter circuit that drives the generator; a motor that inputs and outputs power from and to an axle; a motor inverter circuit that drives the motor; a secondary battery that transmits electric power to and from the generator and the motor via the generator inverter circuit and the motor inverter circuit; an accumulated charge ratio detecting module that detects an accumulated charge ratio as a ratio of an accumulated charge amount to whole capacity of the secondary battery; and a control module that, upon satisfaction of a predetermined condition that the detected accumulated charge ratio is less than or equal to a predetermined accumulated charge ratio in a state that a gearshift position is a neutral position and both of the generator inverter circuit and the motor inverter circuit are shut off, controls the internal combustion engine and the generator so that the internal combustion engine is cranked by the generator and started in a case that a vehicle stop is held, and controls the generator inverter circuit to be shut off and the internal combustion engine to be operated at a rotation speed that the back electromotive force generated with the rotation of the generator is more than a voltage applied to the generator inverter circuit after the internal combustion engine is started.

In the hybrid vehicle according to this aspect of the invention, upon satisfaction of a predetermined condition that an accumulated charge ratio as a ratio of an accumulated charge amount to whole capacity of the secondary battery is less than or equal to a predetermined accumulated charge ratio in a state that a gearshift position is a neutral position and both of the generator inverter circuit and the motor inverter circuit are shut off, the internal combustion engine and the generator are controlled so that the internal combustion engine is cranked by the generator and started in a case that a vehicle stop is held (hereafter this state is referred to as a stop held state), and the generator inverter circuit is controlled to be shut off and the internal combustion engine is controlled to be operated at a rotation speed that back electromotive force generated with the rotation of the generator is more than a voltage applied to the generator inverter circuit after the internal combustion engine is started. That is, upon the satisfaction of the predetermined condition, the internal combustion engine is started in the case that the vehicle stop is held, and the secondary battery is charged with the back electromotive force generated on the generator after the internal combustion engine is started. Accordingly, the internal combustion engine is not started until the satisfaction of the predetermined condition after the gearshift position set to the neutral position. This enables to prevent fuel consumption of the internal combustion engine before the satisfaction of the predetermined condition, in comparison with a case that the internal combustion engine is immediately started after the gearshift position set to the neutral position and a self-sustained operation of the internal combustion engine is performed. This also enables to charge the secondary battery with the back electromotive force generated on the generator after the internal combustion engine is started. The 'stop held state' includes a state where a manipulating variable of a brake is more than or equal to a predetermined manipulating variable or a state where the axle is locked by a parking brake.

In one preferable application of the hybrid vehicle of the invention, the control module may control the internal combustion engine and the generator so that the secondary battery is charged with electricity power that is generated by the generator using power from the internal combustion engine, in a case that the vehicle stop is held after the internal combustion engine is started.

In another preferable application of the hybrid vehicle of the invention, the hybrid vehicle may further have: an announcement unit that announces information, and the control module may control the announcement module to announce information for asking a driver to perform operation to hold the vehicle stop, in a case that the vehicle stop is not held upon the satisfaction of the predetermined condition. This arrangement enables to start the internal combustion engine when the vehicle stop is held by performance of the operation by a driver after the announcement of the information, and then to charge the secondary battery.

In still another preferable application of the hybrid vehicle of the invention, the generator inverter circuit may be a circuit that has two or more diodes performing full-wave rectification for the back electromotive force generated on the generator. In still another preferable application of the hybrid vehicle of the invention, the hybrid vehicle may further have: a planetary gear mechanism with three elements each connected to three shafts, a driveshaft linked to the axle, the output shaft of the internal combustion engine, and a rotating shaft of the generator, and the motor may input and output power from and to the driveshaft.

According to another aspect, the present invention is directed to a control method of a hybrid vehicle having an internal combustion engine, a generator that inputs and outputs power from and to an output shaft of the internal combustion engine, rotates at an rotation speed corresponding to an rotation speed of the internal combustion engine, and generates back electromotive force with rotation, a generator inverter circuit that drives the generator, a motor that inputs and outputs power from and to an axle, a motor inverter circuit that drives the motor, and a secondary battery that transmits electric power to and from the generator and the motor via the generator inverter circuit and the motor inverter circuit, the control method including: upon satisfaction of a predetermined condition that an accumulated charge ratio as a ratio of an accumulated charge amount to whole capacity of the secondary battery is less than or equal to a predetermined accumulated charge ratio in a state that a gearshift position is a neutral position and both of the generator inverter circuit and the motor inverter circuit are shut off, controlling the internal combustion engine and the generator so that the internal combustion engine is cranked by the generator and started in a case that a vehicle stop is held, and controlling the generator inverter circuit to be shut off and the internal combustion engine to be operated at a rotation speed that the back electromotive force generated with the rotation of the generator is more than a voltage applied to the generator inverter circuit after the internal combustion engine is started.

In the control method of the hybrid vehicle according to this aspect of the invention, upon satisfaction of a predetermined condition that an accumulated charge ratio as a ratio of an accumulated charge amount to whole capacity of the secondary battery is less than or equal to a predetermined accumulated charge ratio in a state that a gearshift position is a neutral position and both of the generator inverter circuit and the motor inverter circuit are shut off, the internal combustion engine and the generator are controlled so that the internal combustion engine is cranked by the generator and started in a case that a vehicle stop is held (hereafter this state is referred to as a stop held state), and the generator inverter circuit is controlled to be shut off and the internal combustion engine is controlled to be operated at a rotation speed that back electromotive force generated with the rotation of the generator is more than a voltage applied to the generator inverter circuit after the internal combustion engine is started. That is, upon the satisfaction of the predetermined condition, the internal combustion engine is started in the case that the vehicle stop is held, and the secondary battery is charged with the back electromotive force generated on the generator after the internal combustion engine is started. Accordingly, the internal combustion engine is not started until the satisfaction of the predetermined condition after the gearshift position set to the neutral position. This enables to prevent fuel consumption of the internal combustion engine before the satisfaction of the predetermined condition, in comparison with a case that the internal combustion engine is immediately started after the gearshift position set to the neutral position and a self-sustained operation of the internal combustion engine is performed. This also enables to charge the secondary battery with the back electromotive force generated on the generator after the internal combustion engine is started. The 'stop held state' includes a state where a manipulating variable of a brake is more than or equal to a predetermined manipulating variable or a state where the axle is locked by a parking brake.

BRIEF DESCRIPTION OF THE DRAWINGS

FIG. 1 schematically illustrates the configuration of a hybrid vehicle 20 in one embodiment of the invention;

MODES FOR CARRYING OUT THE INVENTION

Figure 2:
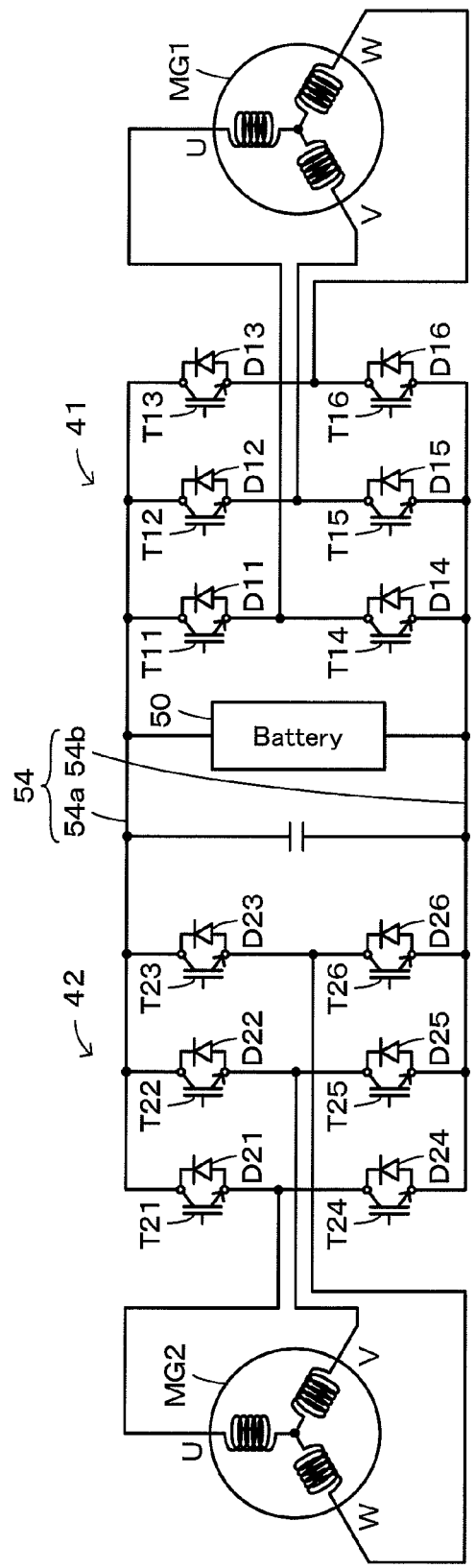
FIG. 2 schematically illustrates the configuration of an electric driving system including the motors MG1 and MG2 on a hybrid vehicle 20.

One mode of carrying out the invention is discussed below as a preferred embodiment.

Figure 1:
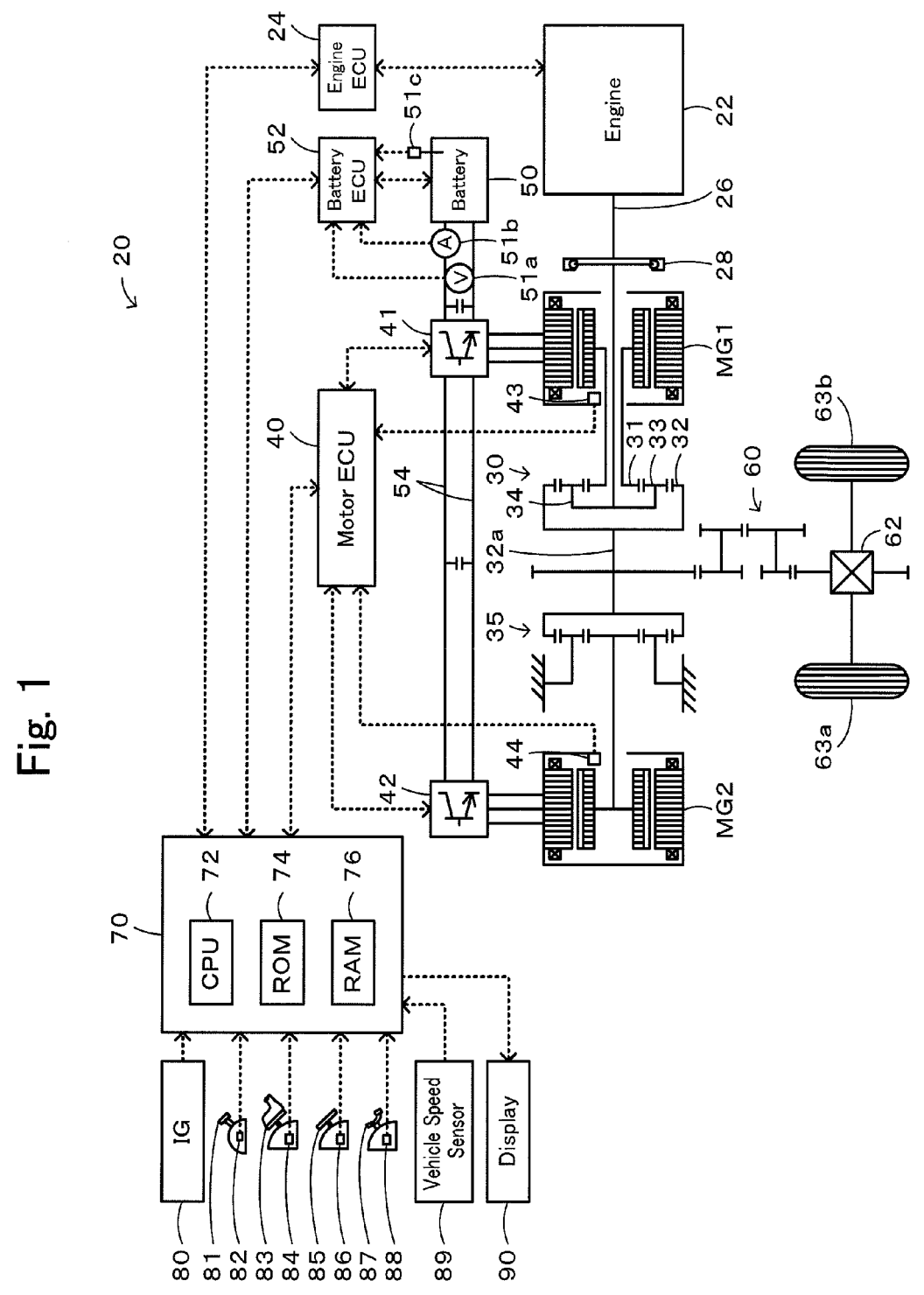

FIG. 1 schematically illustrates the configuration of a hybrid vehicle 20 in one embodiment of the invention. As illustrated, the hybrid vehicle 20 of the embodiment includes the engine 22, a three shaft-type power distribution integration mechanism 30 connected via a damper 28 to a crankshaft 26 functioning as an output shaft of the engine 22, a motor MG1 connected to the power distribution integration mechanism 30 and designed to have power generation capability, a reduction gear 35 attached to a ring gear shaft 32a functioning as a driveshaft linked with the power distribution integration mechanism 30, a motor MG2 connected to the reduction gear 35, inverters 41 and 42 each for driving the motors MG1 and MG2, a battery 50 transmitting electric power to and from the motors MG1 and MG2 via inverters 41 and 42, and a hybrid electronic control unit 70 configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24 that inputs diverse signals from various sensors, for example, a crank position from a non-illustrated crank positions sensor to detect the crank angle of the crankshaft 26, used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit 70 according to the requirements. The engine ECU 24 also computes a rotation speed of the crankshaft 26, which is equivalent to a rotation speed Ne of the engine 22, based on the crank position from the crank positions sensor.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Each of the motors MG1 and MG2 has a rotor with permanent magnets attached thereto and a stator with three phase coils wound thereon. Both of the motors MG1 and MG2 are constructed as known synchronous motor generators. As shown the schematic structure of an electric driving system including the motors MG1 and MG2 in FIG. 2, each of the inverters 41 and 42 has six transistors T11 to T16 or T21 to T26 and six diodes D11 to D16 or D21 to D26 connected in inverse parallel with the transistors T11 to T16 or T21 to T26. The six transistors T11 to T16 or T21 to T26 are arranged in pairs, so that two transistors in each pair respectively work as a source side and a sink side to a positive electrode bus line 54a and to a negative electrode bus line 54b of the power lines 54. The three-phase coils (U phase, V phase, and W phase) of the motors MG1 and MG2 are respectively connected to connection points of the corresponding three pairs of the transistors. Controlling the rate of the ON time of the transistors T11 to T16 or T21 to T26 arranged in pairs with application of a voltage between the positive electrode bus line 54a and the negative electrode bus line 54b of the power lines 54 forms a rotating magnetic field on the three-phase coils to rotate and drive the motor MG1 or the motor MG2. The inverters 41 and 42 share the positive electrode bus line 54a and the negative electrode bus line 54b. Such connection enables electric power generated by one of the motors MG1 and MG2 to be supply to the other. Operations of both of the motors MG1 and MG2 are controlled by a motor electronic control unit (hereafter referred to as motor ECU) 40. The motor ECU 40 inputs diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is constructed as a lithium ion secondary battery and under control of a battery electronic control unit (hereafter referred to as battery ECU) 52. The battery ECU 52 inputs diverse signals required for control of the battery 50, for example, an inter-terminal voltage Vb measured by a voltage sensor 51a disposed between terminals of the battery 50, a charge-discharge current Ib measured by a current sensor 51b attached to the power line 54 connected with the output terminal of the battery 50, and a battery temperature Tb measured by a temperature sensor 51c attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. An accumulated charge ratio SOC of the battery 50 as a ratio of an accumulated charge amount in the battery 50 to the total capacity (storage capacity) of the battery 50 is calculated from an integrated value of the charge-discharge current Ib measured by the current sensor 51b. An input limit Win as an allowable charging electric power to be charged in the battery 50 and an output limit Wout as an allowable discharging electric power to be discharged from the battery 50 are set corresponding to the calculated accumulated charge ratio SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the accumulated charge ratio SOC of the battery 50, and multiplies the base values of the input limit Win and the output limit Wout by the specified input limit correction factor and output limit correction factor to determine the input limit Win and the output limit Wout of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, an operating signal from a parking brake sensor 88 that detects an operating state of a parking brake pedal 87 for operating a foot-operated parking brake (not shown), and a vehicle speed V from a vehicle speed sensor 89. The hybrid electronic control unit 70 outputs control signals to a display 90 that displays variety of information via the output port. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. In the hybrid vehicle 20 of the embodiment, the gearshift position SP detected by the gearshift position sensor 82 has multiple different options: parking position (P position), neutral position (N position), drive position (D position), and reverse position (R position).

The hybrid vehicle 20 of the embodiment thus constructed calculates a torque command to be output to the ring gear shaft 32a functioning as the driveshaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque command to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
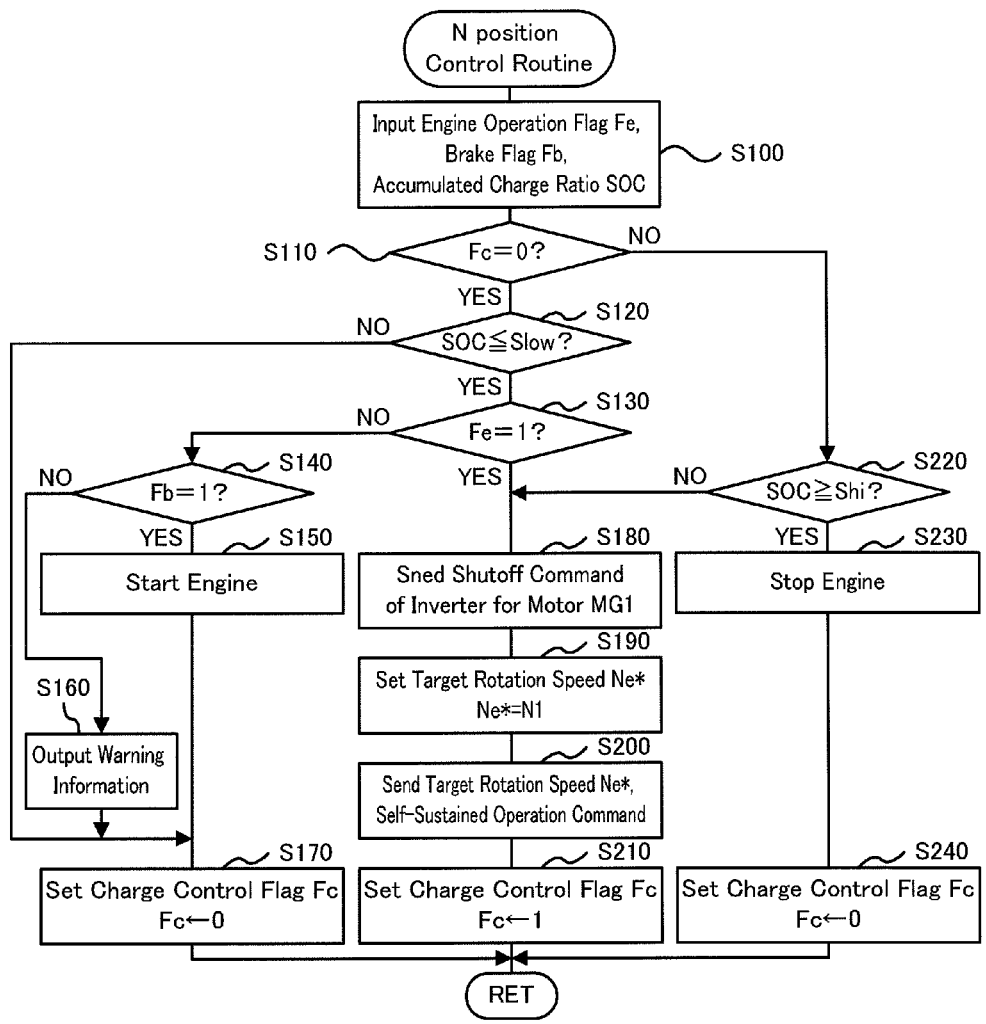
FIG. 3 is a flowchart showing a N position control routine executed by the hybrid electronic control unit 70.

The description regards the operations of the hybrid vehicle 20 of the embodiment having the configuration discussed above. FIG. 3 is a flowchart showing a N position control routine executed by the hybrid electronic control unit 70. This routine is performed repeatedly when the gearshift position SP is the N position. A case that the gearshift position SP is set to the N position during stop of the engine 22 is described below. The inverters 41 and 42 are shut off (all of the transistors T11 to T16 and T21 to T26 are switched to an off state) in response to the gearshift position SP set to the N position.

In the N position control routine, the CPU 72 of the hybrid electronic control unit 70 inputs various data, for example, an engine operation flag Fe that shows whether the engine 22 is operated or not, a brake flag Fb that shows whether a vehicle stop is held (hereafter this state is referred to as a stop held state) or not, the accumulated charge ratio SOC of the battery 50 (step S100). The engine operation flag Fe is set to value '1' when the engine 22 is operated, set to value '0' when the engine 22 is not operated, and input from the engine ECU 24 by communication. The brake flag Fb is set to value '1' when the vehicle stop is held, set to value '0' when the vehicle stop is not held, and input, by the hybrid electronic control unit 70. In this embodiment, whether the vehicle state is the stop held state or not is determined according to the brake pedal position BP from the brake pedal position sensor 86, and lock information. The lock information is obtained based on the operating signals from the parking brake sensor 88, and shows whether the driving wheels 63a and 63b are locked by the parking brake (not shown). Specifically, it is determined the vehicle state is the stop held state, when the brake pedal position BP is more than or equal to a threshold value BPref (for example, 40% or 50%) or when the driving wheels 63a and 63b are locked by the parking brake. On the other hand, it is determined the vehicle state is not the stop held state, when the brake pedal position BP is less than the threshold value BPref and the driving wheels 63a and 63b are not locked by the parking brake. The accumulated charge ratio SOC of the battery 50 is calculated from the integrated value of the charge-discharge current Ib measured by the current sensor 51b and input from the battery ECU 52 by communication.

After the data input, the CPU 72 checks the value of the charge control flag Fc (step S110). The charge control flag Fc is set to value '1' when a charge control is performed, and set to value '0' when the charge control is not performed. The charge control is a control where the engine 22 and the motor MG1 are controlled to charge the battery 50 at the state that the gearshift position SP is the N position. When the charge control flag Fc is value '0', the CPU 72 compares the accumulated charge ratio SOC of the battery 50 with a threshold value Slow (step S120). The threshold value Slow is set as a upper limit of the accumulated charge ratio SOC required to start the charge control, and set to, for example, 25% or 30%. When the accumulated charge ratio SOC is more than the threshold value Slow, the CPU 72 determines the start of the charge control is not required, and sets the charge control flag F to value '0' (step S170). This routine is terminated.

When the accumulated charge ratio SOC is less than or equal to the threshold value Slow (for example, when the accumulated charge ratio SOC of the battery 50 decreases by drive of auxiliary machineries such as a compressor of the air conditioner (not shown), and becomes less than or equal to the threshold valued Slow), the CPU 72 determines the start of the charge control is required, checks the value of the engine operation flag Fe (step S130). When the engine operation flag Fe is value '0', that is, when the engine 22 is not operated, the CPU 72 checks the value of the brake flag Fb (step S140). When the brake flag Fb is value '1', that is, when the vehicle state is the stop held state, the CPU 72 sends control signal for stating the engine 22 to the motor ECU 40 and the engine ECU 24 (step S150), and sets the charge control flag Fc to value '0' (step S170). This routine is terminated. The motor ECU 40 controls the motor MG1 to output a torque for cranking the engine 22 from the motor MG1, in response to reception of the control signal for stating the engine 22. The engine ECU 24 starts fuel injection and ignition when the rotation speed Ne of the engine 22 reaches to a threshold value Nref (for example, 1000 rpm or 1200 rpm) to start the engine 22, in response to reception of the control signal for stating the engine 22.

On the other hand, when the brake flag Fb is value '0' at step S140, that is, when the vehicle state is not the stop held state, the CPU 72 outputs warning information (for example, 'Please step on brake pedal' or 'Please switch parking brake to ON') to the display 90, so that the vehicle state changes to the stop held state by the drive stepping on the brake pedal 85 or the parking brake pedal 87 (step S160), and sets the charge control flag Fc to value '0' (step S170). This routine is terminated. Then, when the brake flag Fb becomes to value '1' by the driver stepping on the brake pedal 85 or the parking brake pedal 87 (step S140), the CPU 72 sends the control signal for starting the engine 22 to the motor ECU 40 and the engine ECU 24 to start the engine 22 (step S150).

Figure 4:
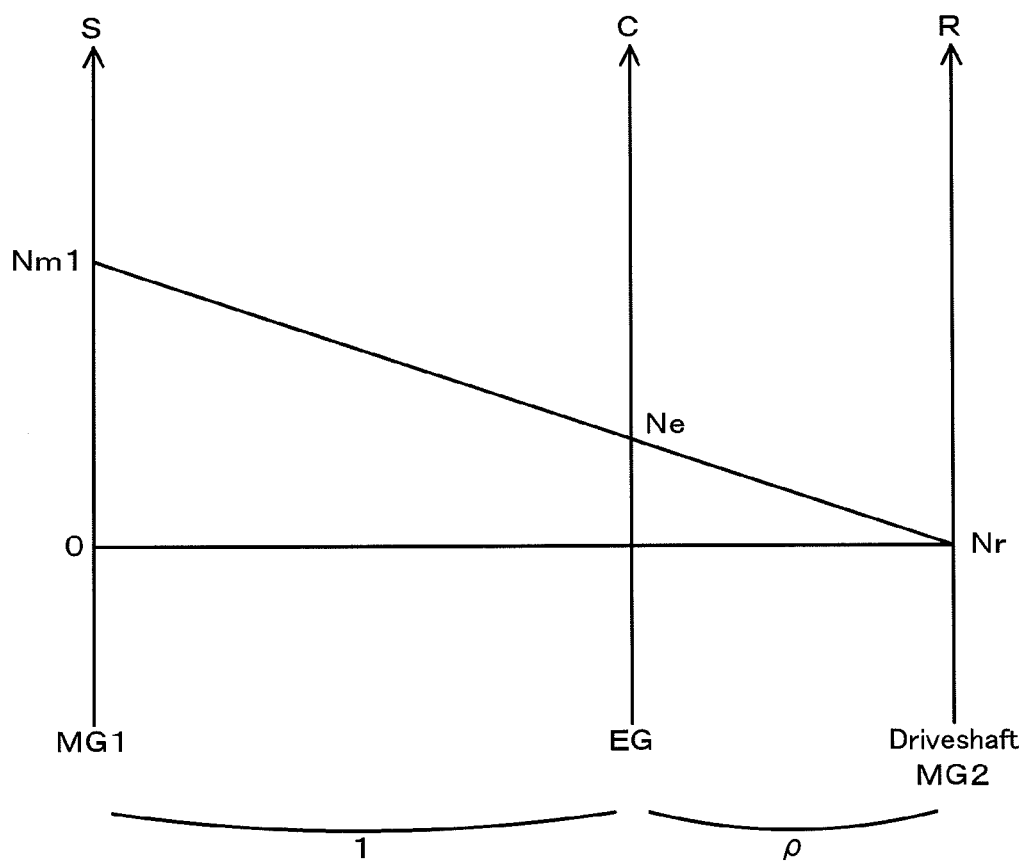
FIG. 4 is an alignment chart showing rotation speed dynamics of the respective rotational elements included in the power distribution integration mechanism 30 during shutoff of both of the inverters 41 and 42.

After the engine 22 is started, the CPU 72 determines the engine operation flag Fe is value '1' at step S130, sends a shutoff command of the inverter 41 for driving the motor MG1 to the motor ECU 40 (step S180), sets a target rotation speed Ne* used in the performance of a self-sustained operation of the engine 22 to a rotation speed N1 that is relatively high (step S190), sends the set target rotation speed Ne* and a self-sustained operation command of the engine 22 to the engine ECU 24 (step S200), and sets the charge control flag Fc to value '1' (step S210). This routine is terminated. In response to reception of the set target rotation speed Ne* and the self-sustained operation demand, the engine ECU 24 performs required controls including the intake air flow control, the fuel injection control, the ignition control of the engine 22 to perform the self-sustained operation of the engine 22 at the set target rotation speed Ne*. The rotation speed N1 is set within the rotation speed range that back electromotive force generated with rotation of the motor MG1 is more than a voltage applied to the inverters 41 and 42. FIG. 4 is an alignment chart showing rotation speed dynamics of the respective rotational elements included in the power distribution integration mechanism 30 during the shutoff of both of the inverters 41 and 42. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr (value '0') of the ring gear 32 obtained by dividing the rotation speed Nm2 of the motor MG2 by the gear ratio Gr of the reduction gear 35. As shown in FIG. 4, when the engine 22 rotates, the motor MG1 rotates at a rotation speed according to the rotation speed dynamics (a gear ratio ρ) on the respective rotational elements included in the power distribution integration mechanism 30, and the back electromotive force generates on the motor MG1 with the rotation of the motor MG1. The greater rotation speed of the motor MG1 causes the greater back electromotive force. In a case that the back electromotive force is less than or equal to the voltage applied to the inverters 41 and 42 in the state that the inverter 41 is shut off, the current caused by the back electromotive force does not flow to the power lines 54. In a case that the back electromotive force is more than the voltage applied to the inverters 41 and 42 in the state that the inverter 41 is shut off, on the other hand, the diodes D11 to D16 of the inverter 41 function as a full-wave rectifier circuit and thereby the current caused by the back electromotive force flows to the power lines 54 to charge the battery 50. In this embodiment, the rotation speed N1 is set within the rotation speed range that the battery 50 is charged, and set to, for example, 3000 rpm, 3500 rpm or 4000 rpm. Performing the self-sustained operation of the engine 22 at the rotation speed N1 enables to charge the battery 50 with the back electromotive force generated with the rotation of the motor MG1.

When the charge control flag Fc is value '1' at step S110, the CPU 72 compares the accumulated charge ratio SOC with a threshold value Shi (step S220). The threshold value Shi is set as a lower limit of the accumulated charge ratio SOC required to stop the charge control, and set to, for example, 45% or 50%. When the accumulated charge ratio SOC of the battery 50 is less than the threshold value Shi, the CPU 72 executes the processing of steps S180 to S210. This routine is terminated. This causes the continuation of charge of the battery 50. When the accumulated charge ratio SOC of the battery 50 is more than or equal to the threshold value Shi, on the other hand, the CPU 72 determines the stop of the charge control is required, the CPU 72 sends control signal for stopping the operation of the engine 22 to the engine ECU 24 (step S230), and sets the charge control flag Fc to value '0' (step S240). This routine is terminated. In response to reception of the control signal for stopping the operation of the engine 22, the engine ECU 24 stops the control of the engine 22. This causes the stop of the charge of the battery 50. Stopping the operation of the engine 22 when the accumulated charge ratio SOC of the battery 50 is more than or equal to the threshold value Shi enables to prevent waste fuel consumption, in comparison with continuing that the operation of the engine 22 when the battery 50 is not charged. In this arrangement, the Shutoff of the inverters 41 and 42 is continued.

In the hybrid vehicle 20 of the embodiment described above, when the gearshift position SP is the N position and the accumulated charge ratio SOC of the battery 50 is less than or equal to the threshold value Slow, the engine 22 is cranked by the motor MG1 and started in the case that the vehicle stop is held, and the shutoff of the inverter 41 is performed and the self-sustained operation of the engine 22 is performed at the rotation speed N1 at which the back electromotive force generated on the motor MG1 is more than the voltage applied to the inverters 41 and 42 after the engine 22 is started. This enables, in comparison with a case that the engine 22 is immediately started after the gearshift position SP set to the N position, to prevent the fuel consumption of the engine 22 before the start of charge of the battery 50. This also enables to charge the battery 50 with the back electromotive force generated on the motor MG1 after the engine 22 is started.

In the hybrid vehicle 20 of the embodiment, the discussion is made in the case that the gearshift position SP is set to the N position during the stop of the operation of the engine 22. In a case that the gearshift position SP is set to the N position during the operation of the engine 22, the engine 22 may be stopped, and then the engine 22 may be started as the condition that the vehicle stop is held when the accumulated charge ratio SOC of the battery 50 becomes less than or equal to the threshold value Slow, as well as the embodiment. This accordingly enables to exert the similar effects to those of the embodiment.

In the hybrid vehicle 20 of the embodiment, whether the vehicle state is the stop held state or not is determined using the brake pedal position BP and the lock information that shows whether the driving wheels 63*a* and 63*b* are locked by the parking brake or not. This is not essential, and whether the vehicle state is the stop held state or not may be determined using only one of the brake pedal position BP and the lock information. In the hybrid vehicle 20 of the embodiment, the parking brake is the foot-operated type for locking or unlocking the drive wheels 63*a* and 63*b*. This is not essential, and the parking brake may be a lever type or a switch type, by hand.

Figure 5:
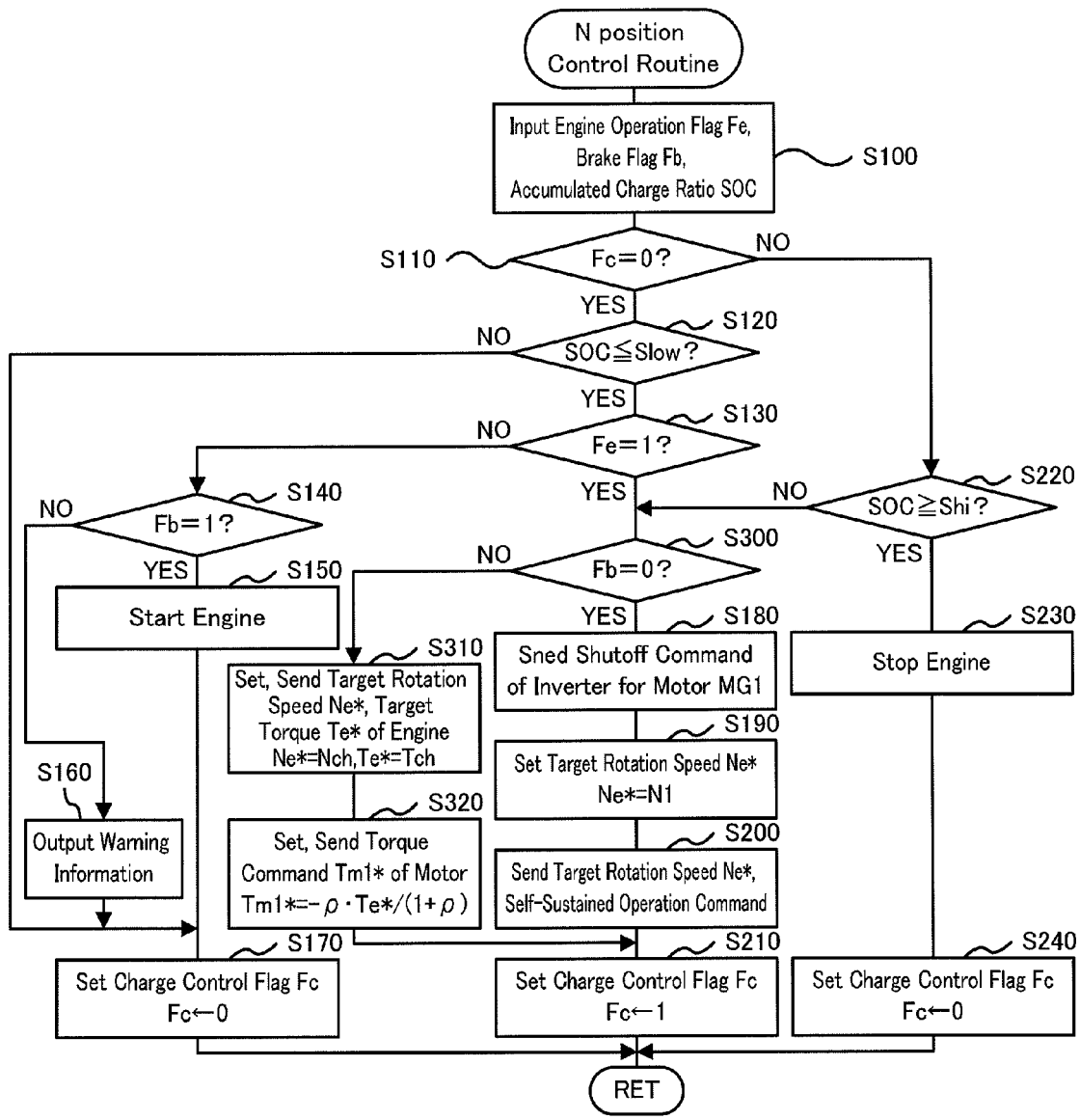
FIG. 5 is a flowchart showing a N position control routine executed in one modified example.

In the hybrid vehicle 20 of the embodiment, after the engine 22 is started, the battery 50 is charged with the back electromotive force generated on the motor MG1 by the performance of the self-sustained operation of the engine 22 at the rotation speed N1. In one modified example, in a case that the vehicle state is the stop held state after the engine 22 is started (in a case that the vehicle stop state continues from before the start of the engine 22, or in a case that the vehicle stop state interrupts after the start of the engine 22 and then the vehicle stop state returns), the battery 50 may be charged with electricity power that is generated by the motor MG1 using the power from the engine 22. FIG. 5 is a flowchart showing a N position control routine executed in one modified example. This routine is same as the N position control routine of FIG. 3, except for a point adding a processing of steps S300 to S320. Thus, in the N position control routine of FIG. 5, the same processing as the processing of the N position control routine of FIG. 3 is expressed by the same step numbers as step numbers of the N position control routine of FIG. 3 and is not specifically explained here. In this N position control routine of FIG. 5, when the engine flag Fe is value '1' at step 130 by the start of the engine 22, the CPU 72 checks the brake flag Fb (step S300). When the brake flag Fb is value '1', the CPU 72 sets the target rotation speed Ne* of the engine 22 to the predetermined rotation speed Nch (for example, 2000 rpm or 2500 rpm) as a rotation speed for charging the battery 50, sets the target torque Te* of the engine 22 to the predetermined torque Tch as a torque for charging the battery 50, and sends the set target rotation speed Ne* and the set target torque Te* to the engine ECU 24 (step S310). The CPU 72 subsequently sets the torque command Tm1* of the motor MG1 to a torque calculated from the set target toque Te* and the gear ratio ρ of the power distribution integration mechanism 30 according to Equation (1) given below, and sends the set torque command Tm1* to the motor ECU 40 (step S320), and sets the charge flag Fc to value '1' (step S210). This routine is terminated. This enables to charge the battery 50 with the electric power that is generated by the motor MG1 using the power from the engine 22. In this modified example, it is not necessary for the back electromotive force generated on the motor MG1 to rise than the voltage applied to the inverters 41 and 42, thereby the rotation speed Nch is normally is set to a rotation speed that is less than the rotation speed N1. As a result, this modified example enables to prevent to give feeling of incompatibility to a driver due to rev up the rotation speed Ne of the engine 22. Equation (1) is readily introduced from the alignment chart of FIG. 4 described above.

$$Tm1^* = -\rho \cdot Te^*/(1+\rho) \quad (1)$$

In the hybrid vehicle 20 of the embodiment, in the case that the accumulated charge ratio SOC of the battery 50 reaches more than or equal to the threshold value Shi during the execution of the charge control, the operation of the engine 22 is stopped, but the engine 22 may be operated at a rotation speed N2 that is less than the rotation speed N1. The rotation speed N2 may be set within the rotation speed range that the back electromotive force generated on the motor MG1 is less than or equal to the voltage VH of the high voltage system, and set to, for example, 1000 rpm or 1200 rpm. In this arrangement, stopping the operation of the engine 22 as well as the embodiment until the requirement of the start of the charge control after the gearshift position SP set to the N position enables to prevent the fuel consumption.

In the hybrid vehicle 20 of the embodiment, the warning information (for example, text or image such as 'Please step on brake pedal' or 'Please switch parking brake to ON') is output to the display 90. This is not essential, and the warning information may be output from speaker (not shown), in addition to or in place of output to the display 90. The warning information may not be output.

Figure 6:
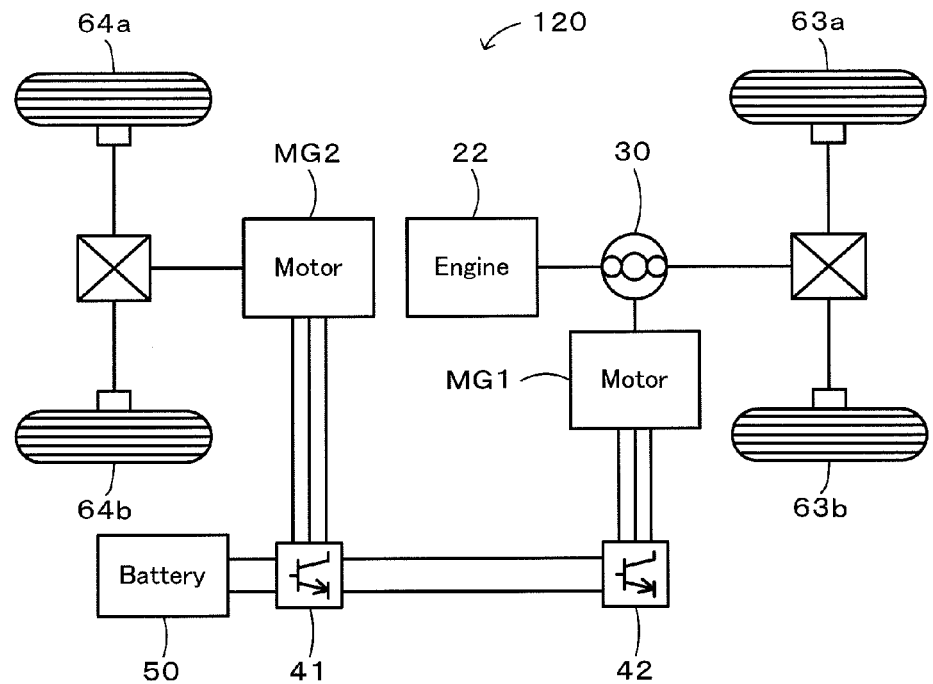
FIG. 6 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 6. In the hybrid vehicle 120 of FIG. 6, the power of the motor MG2 is connected to another axle (an axle linked with wheels 64a and 64b) that is different from the axle connecting with the ring gear shaft 32a (the axle linked with the drive wheels 63a and 63b).

Figure 7:
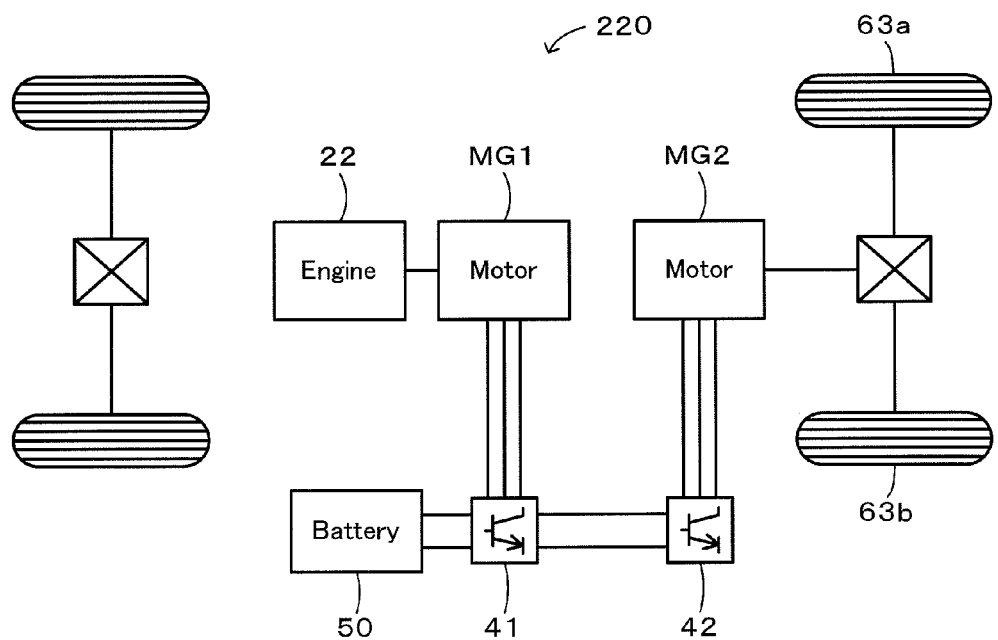
FIG. 7 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of a modified structure shown in FIG. 7. In the hybrid vehicle 220 of FIG. 7, the motor MG1 for power generation is connected with the engine 22, the motor MG2 is connected with the drive wheels 63a and 63b, and the battery 50 is connected with the inverters 41 and 42 that drive the motors MG1 and MG2.

In the above embodiment, the invention is described using an application to a hybrid vehicle. The invention may be applied to a control method of a hybrid vehicle.

The primary elements in the embodiment and its modified examples are mapped to the primary constituents in the claims of the invention as described below. The engine 22 corresponds to the 'internal combustion engine' in the claims of the invention. The motor MG1 corresponds to the 'generator' in the claims of the invention. The inverter 41 corresponds to the 'generator inverter circuit' in the claims of the invention. The motor MG2 corresponds to the 'motor' in the claims of the invention. The inverter 42 corresponds to the 'motor inverter circuit' in the claims of the invention. The battery 50 corresponds to the 'secondary battery' in the claims of the invention. The battery ECU 52 that calculates the accumulated charge ratio SOC of the battery 50 from an integrated value of the charge-discharge current Ib of the battery 50 corresponds to the 'accumulated charge ratio detecting module' in the claims of the invention. A combination of the hybrid electronic control unit 70, the engine ECU 24 and the motor ECU 40 corresponds to the 'control module' in the claims of the invention. In the combination, the hybrid electronic control unit 70, when the gearshift position SP is the N position and the accumulated charge ratio SOC of the battery 50 is less than or equal to the threshold value Slow, sends the control signal for starting the engine 22 to the motor ECU 24 and the engine ECU 24 in the case that the vehicle stop is held. The hybrid electronic control unit 70, After the engine 22 is started, sends the shutoff command of the inverter 41 to the motor ECU 40, sets the target rotation speed Ne* of the engine 22 to the rotation speed N1 that is relatively low and sends the set target rotation speed Ne* and the self-sustained operation command to the engine ECU 24. In the combination, the motor ECU 40 controls the motor MG1 to output a torque for cranking the engine 22 from the motor MG1 when receiving the control signal for stating the engine 22, performs the shutoff of the inverter 41 when receiving the shutoff command of the inverter 41, and preforms the shutoff the inverter 42 when receiving the shutoff command of the inverter 42. In the combination, the engine ECU 24 starts the fuel injection and the ignition when the rotation speed Ne of the engine 22 reaches to the threshold value Nref after the reception of the control signal for stating the engine 22, and controls the engine 22 to perform the self-sustained operation of the engine 22 when receiving the target rotation speed Ne* and the self-sustained operation demand. The power distribution integration mechanism 30 corresponds to the 'planetary gear mechanism' in the claims of the invention.

The 'internal combustion engine' is not restricted to the internal combustion engine designed to consume a hydrocarbon fuel, such as gasoline or light oil, and thereby output power, but may be any other type, for example, a hydrogen engine. The 'generator' is not restricted to the motor MG1 constructed as a synchronous motor generator but may be any type of generator constructed to input and output power from and to an output shaft of the internal combustion engine, to rotate at an rotation speed corresponding to an rotation speed of the internal combustion engine, and to generate back electromotive force with rotation, for example, an induction motor. The 'generator inverter circuit' is not restricted to the inverter 41 but may be any type of inverter circuit for driving the generator. The 'motor' is not restricted to the motor MG2 constructed as a synchronous motor generator but may be any type of motor constructed to input and output power from and to an axle, for example, an induction motor. The 'motor inverter circuit' is not restricted to the inverter 42 but may be any type of inverter circuit for driving the motor. The 'secondary battery' is not restricted to the battery 50 constructed as a lithium ion battery but may be any other type of secondary battery transmitting electric power to and from the generator and the motor via the generator inverter circuit and the motor inverter circuit, for example, a nickel metal hydride battery, a nickel cadmium battery, and a lead acid battery. The 'accumulated charge ratio detecting module' is not restricted to the arrangement of calculating the accumulated charge ratio SOC of the battery 50 from an integrated value of the charge-discharge current Ib of the battery 50, but may be any other arrangement of detecting an accumulated charge ratio as a ratio of an accumulated charge amount to whole capacity of the secondary battery, for example, an arrangement of calculating the accumulated charge ratio SOC of the battery 50 from an open circuit voltage of the battery 50. The 'control module' is not restricted to the combination of the hybrid electronic control unit 70, the engine ECU 24 and the motor ECU 40 but may be actualized by a single electronic control unit. The 'control module' is not restricted to the arrangement described below. When the gearshift position SP is the N position and the accumulated charge ratio SOC of the battery 50 is less than or equal to the threshold value Slow, the engine 22 is cranked by the motor MG1 and started in the case that the vehicle stop is held, and then the shutoff of the inverter 41 is performed and the self-sustained operation of the engine 22 is performed at the rotation speed N1 at which the back electromotive force generated on the motor MG1 is more than the voltage applied to the inverters 41 and 42. The 'control module' may be any other arrangement of, upon satisfaction of a predetermined condition that the detected accumulated charge ratio is less than or equal to a predetermined accumulated charge ratio in a state that a gearshift position is a neutral position and both of the generator inverter circuit and the motor inverter circuit are shut off, controlling the internal combustion engine and the generator so that the internal combustion engine is cranked by the generator and started in a case that the vehicle stop is held, and controlling the generator inverter circuit to be shut off and the internal combustion engine to be operated at a rotation speed that the back electromotive force generated with the rotation of the generator is more than a voltage applied to the generator inverter circuit after the internal combustion engine is started. The 'planetary gear mechanism' is not restricted to the power distribution integration mechanism 30 but may be any other mechanism with three elements each connected to three shafts, a driveshaft linked to the axle, the output shaft of the internal combustion engine, and a rotating shaft of the generator, for example, a structure adopting a double pinion-type planetary gear mechanism, or a structure adopting a combination of multiple planetary gear mechanisms and connected with four or more axes.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the hybrid vehicles.

The invention claimed is:

1. A hybrid vehicle, comprising:
an internal combustion engine;
a generator that inputs and outputs power from and to an output shaft of the internal combustion engine, rotates at an rotation speed corresponding to an rotation speed of the internal combustion engine, and generates back electromotive force with rotation;
a generator inverter circuit that drives the generator;
a motor that inputs and outputs power from and to an axle;
a motor inverter circuit that drives the motor;
a secondary battery that transmits electric power to and from the generator and the motor via the generator inverter circuit and the motor inverter circuit;
an accumulated charge ratio detecting module that detects an accumulated charge ratio as a ratio of an accumulated charge amount to whole capacity of the secondary battery; and
a control module that, upon satisfaction of a predetermined condition that the detected accumulated charge ratio is less than or equal to a predetermined accumulated charge ratio in a state that a gearshift position is a neutral position and both of the generator inverter circuit and the motor inverter circuit are shut off, controls the internal combustion engine and the generator so that the internal combustion engine is cranked by the generator and started in a case that the vehicle stop is held, and controls the generator inverter circuit to be shut off and the internal combustion engine to be operated at a rotation speed that the back electromotive force generated with the rotation of the generator is more than a voltage applied to the generator inverter circuit after the internal combustion engine is started.

2. The hybrid vehicle in accordance with claim 1, wherein the control module controls the internal combustion engine and the generator so that the secondary battery is charged with electricity power that is generated by the generator using power from the internal combustion engine, in a case that a vehicle stop is held after the internal combustion engine is started.

3. The hybrid vehicle in accordance with claim 1, the hybrid vehicle further comprising:
an announcement unit that announces information,
wherein the control module controls the announcement module to announce information for asking a driver to perform operation to hold the vehicle stop, in a case that the vehicle stop is not held upon the satisfaction of the predetermined condition.

4. The hybrid vehicle in accordance with claim 1, the hybrid vehicle further comprising:
a planetary gear mechanism with three elements each connected to three shafts, a driveshaft linked to the axle, the output shaft of the internal combustion engine, and a rotating shaft of the generator, wherein the motor inputs and outputs power from and to the driveshaft.

5. A control method of a hybrid vehicle having an internal combustion engine, a generator that inputs and outputs power from and to an output shaft of the internal combustion engine, rotates at an rotation speed corresponding to an rotation speed of the internal combustion engine, and generates back electromotive force with rotation, a generator inverter circuit that drives the generator, a motor that inputs and outputs power from and to an axle, a motor inverter circuit that drives the motor, and a secondary battery that transmits electric power to and from the generator and the motor via the generator inverter circuit and the motor inverter circuit, the control method comprising:

upon satisfaction of a predetermined condition that an accumulated charge ratio as a ratio of an accumulated charge amount to whole capacity of the secondary battery is less than or equal to a predetermined accumulated charge ratio in a state that a gearshift position is a neutral position and both of the generator inverter circuit and the motor inverter circuit are shut off, controlling the internal combustion engine and the generator so that the internal combustion engine is cranked by the generator and started in a case that a vehicle stop is held, and controlling the generator inverter circuit to be shut off and the internal combustion engine to be operated at a rotation speed that the back electromotive force generated with the rotation of the generator is more than a voltage applied to the generator inverter circuit after the internal combustion engine is started.

\* \* \* \* \*